(12) United States Patent
Gonnsen et al.

(10) Patent No.: US 11,176,284 B2
(45) Date of Patent: Nov. 16, 2021

(54) COMPONENT CONFIGURATOR FOR GENERATING VARIANTS OF A COMPONENT TO BE INSTALLED

(71) Applicants: AIRBUS OPERATIONS GMBH, Hamburg (DE); AIRBUS SAS, Blagnac (FR)

(72) Inventors: Johannes Gonnsen, Hamburg (DE); Thomas Thieme, Pibrac (FR)

(73) Assignees: Airbus Operations GmbH; AIRBUS SAS

( * ) Notice: Subject to any disclaimer, the term of this patent is extended or adjusted under 35 U.S.C. 154(b) by 283 days.

(21) Appl. No.: 15/946,499

(22) Filed: Apr. 5, 2018

(65) Prior Publication Data
US 2018/0225410 A1 Aug. 9, 2018

Related U.S. Application Data

(63) Continuation of application No. PCT/EP2016/074426, filed on Oct. 12, 2016.

(30) Foreign Application Priority Data

Oct. 12, 2015 (DE) .......................... 102015117343.3

(51) Int. Cl.
*G06F 30/15* (2020.01)
*G06F 111/04* (2020.01)
(Continued)

(52) U.S. Cl.
CPC .......... *G06F 30/15* (2020.01); *G06F 2111/04* (2020.01); *G06F 2111/20* (2020.01); *G06F 2119/18* (2020.01); *Y02P 90/02* (2015.11)

(58) Field of Classification Search
CPC .... Y02P 90/265; Y02P 90/02; G06F 17/5095; G06F 2111/04; G06F 2111/20;
(Continued)

(56) References Cited

U.S. PATENT DOCUMENTS

2006/0167582 A1 7/2006 Jayko
2008/0201002 A1 8/2008 Crew et al.
(Continued)

FOREIGN PATENT DOCUMENTS

WO  2006076910 A1  7/2006
WO  2015036390 A1  3/2015

OTHER PUBLICATIONS

Kong, Xian Guang, Jian Tao Chang, and Chao Lei. "Research and Application of Macro-Based Tool Library Integration in CATIA Enviroment." In Applied Mechanics and Materials, vol. 37, pp. 944-948. Trans Tech Publications Ltd, 2010.*

(Continued)

*Primary Examiner* — Justin C Mikowski
(74) *Attorney, Agent, or Firm* — Lerner, David, Littenberg, Krumholz & Mentlik, LLP

(57) ABSTRACT

Disclosed here is a component configurator that generates variants of an aircraft component to be installed. The component configurator includes a detection unit that detects a characteristic of the component, and that determines an available free space for an installation of the component in an installation environment. The available free space is defined by a geometry of the component and/or is dependent on a moving space required by a user. The detection unit is configured to generate geometrically different variants of the component based on the free space available for the installation of the component in the installation environment. The disclosed subject matter further relates to a method for generating variants of an aircraft component to be installed, a program element as well as a computer readable medium on which a program element is stored.

12 Claims, 5 Drawing Sheets

(51) Int. Cl.
*G06F 111/20* (2020.01)
*G06F 119/18* (2020.01)

(58) Field of Classification Search
CPC ............ G06F 2119/18; G06F 2217/02; G06F 2217/06; G06F 2217/12; G06F 30/15
USPC .......................................................... 703/1
See application file for complete search history.

(56) References Cited

U.S. PATENT DOCUMENTS

| | | | |
|---|---|---|---|
| 2012/0109591 A1* | 5/2012 | Thompson | G06F 30/00 703/1 |
| 2013/0144566 A1* | 6/2013 | De Biswas | G06Q 10/101 703/1 |
| 2014/0157194 A1 | 6/2014 | Callahan et al. | |

OTHER PUBLICATIONS

Marjanovic, Nenad, Biserka Isailovic, and Mirko Blagojevic. "Structural optimization in CAD software." Optimization 10.1 (2009): 27-32.*

Tfaily, A., S. Liscouët-Hanke, and G. Esdras. "Parametric 3D Modeling for Integration of Aircraft Systems in Conceptual Design." Canadian Aeronautics and Space Institute Conference. 2015.*

Tretter, J., et al. "Configuration space control of in-vessel components for Wendelstein 7-X." 2013 IEEE 25th Symposium on Fusion Engineering (SOFE). IEEE, 2013.*

Bley, H., and Ch Zenner. "Variant-oriented assembly planning." CIRP annals 55.1 (2006): 23-28.*

Landes-Dallat, Benjamin. "On physical aspects of cabin architectures using tolerancing methods." (2013).*

Lockett, Helen, Sarah Fletcher, and Nicolas Luquet. "Applying design for assembly principles in computer aided design to make small changes that improve the efficiency of manual aircraft systems installations." SAE International Journal of Aerospace 7.2014-01-2266 (2014): 284-291.*

Dharwadkar, Parmanand V., Bin Song, and Thomas M. Gatton. "Project management using intelligent 3-D CAD." AACE International Transactions 1994 (1994): CA2-1.*

Banerjee et al: "CATIA V5-Based Parametric Aircraft Geometry Modeler", SAE International Journal of Aerospace, vol. 6, No. 1, Jul. 20, 2013 (Jul. 20, 2013), pp. 311-321, XP055329623, ISSN: 1946-3901, DOI: 10.4271/2013-01-2321.

Ding: "Manual Assembly Modelling and Simulation for Ergonomics Analysis", Nov. 1, 2013 (Nov. 1, 2013), pp. 1-206, XP055330135, Retrieved from the Internet <URL:http://repository.liverpool.ac.uk/14493/1/DingZiy_Nov2013_14493.pdf> [retrieved on Mar. 29, 2019].

Fleischmann et al: "Catia V5, R19 CAD-Übungen Kurzanleitung Teil 2", Oct. 2, 2014 (Oct. 2, 2014), pp. 1-45, XP055329627, Retrieved from the Internet <URL:https://www.hs-heilbronn.de/6907645/catia-v5-kurzanleitung-r15-teil-2_okt-2014.pdf> [retrieved on Mar. 29, 2018].

Fuchte et al: "Automatic Fuselage System Layout using Knowledge Based Design Rules", 61. Deutscher Luft-Und Raumfahrtkongress 2012, Sep. 12, 2012 (Sep. 12, 2012), pp. 1-8, XP055329619, Retrieved from the Internet <URL:http://www.dglr.de/publikationen/2012/281214.pdf> [retrieved on Mar. 29, 2018].

Meine möbelmanufaktur: Service. Version vom Jul. 15, 2015. URL: https://web.archive.org/web/20150715002003/https://www.meine-moebelmanufaktur.de/service [recherchiert am Nov. 18, 2016].

European Patent Office, International Search Report for International Application PCT/EP2016/074426, dated Jan. 23, 2017, 3 pages.

* cited by examiner

COMPONENT CONFIGURATOR FOR GENERATING VARIANTS OF A COMPONENT TO BE INSTALLED

CROSS-REFERENCE TO PRIORITY APPLICATIONS

This application is a continuation of international patent application number PCT/EP2016/074426, having an international filing date of Oct. 12, 2016, which claims priority to German patent application number DE 102015117343.3, having a filing date of Oct. 12, 2015. The content of the referenced applications is incorporated by reference herein.

TECHNICAL FIELD

Embodiments of the invention relate to the design of aircraft components. In particular, the disclosure relates to a component configurator for generating variants of an aircraft component to be installed. Further, the disclosure relates to a method for generating variants of an aircraft component as well as a program element and a computer readable medium.

BACKGROUND

A plurality of different methods for designing components exist nowadays. Thereby, in particular CAD (computer aided design) programs are used, by means of which components may be designed as well as simulations of the components in an installation environment may be carried out. Furthermore, methods of virtual reality (VR) may be utilized as to simulate components in an installation environment. Such methods may provide information about a possible arrangement of the component in the installation environment and may, however, provide information about the way of installation or assembly. The designed components may be adapted with regard to their mechanic or thermal resistance by using optimization methods as, for example, finite elements analysis.

Patent publication US 2008/0201002 A1 describes a CAD based editing template and manufacturing of an aviation component or aeronautic component. Here, a model of a component is generated with a CAD program, wherein the shape of the component is modified by utilizing templates stored in a storage unit.

Patent publication WO 2015/036390 A1 describes a computer-aided design method for a second three-dimensional object based on a first three-dimensional object which is defined by its boundary surfaces only. The second object is an alternative of the first object, wherein the second object is modified with regard to the first object in terms of some parameters.

BRIEF SUMMARY

It is an object of the disclosure to facilitate the installation of a component in an installation environment.

This object is solved by the subject matters of the independent claims. Exemplary embodiments can be derived from the dependent claims and the following description.

According to an aspect of the disclosure, a component configurator is provided for generating variants of an aircraft component to be installed. The component configurator comprises a detection unit for detecting a characteristic of the component to be installed and for determining an available free space for an installation of the component in an installation environment. Here, the free space available for the installation of the component in the installation environment is defined by a free space predetermined by a geometry of the component and/or dependent on a moving space required by a user. The detection unit is configured to generate geometrically different variants of the component based on the free space available for the installation of the component in the installation environment. The component configurator may detect the characteristic of the component to be installed and determine the available free space by aid of a computer.

With such a component configurator it is possible to generate component which facilitate an assembly process of the component due to their adapted shape. In particular, the component may be designed or adapted with regard to the required moving space for the assembly personnel. This means that the geometrically different variants of the component are designed such that the provided installation position of the component can be easily reached by the assembly personnel and, at the same time, adjacent components which may impede the assembly process are taken into account. In particular, the risk of injuries for the assembly personnel may be reduced as a result of the geometrically different variants of the component being generated in such a manner that a contact of the assembly personnel with the adjacent components, as for example electric wires, is avoided. Preferably, the duration of the assembly and, hence, also the assembly costs for installing the component to be installed in the installation environment may be reduced by the component configurator.

The detection unit may comprise a sensor unit as well as a processing unit. Thereby, the sensor unit detects the characteristics of the component to be installed, for example geometric dimensions of the component to be installed. However, the sensor unit may also detect a characteristic of the installation environment. Likewise, this may be dimensions of adjacent components or distances to adjacent component in the installation environment. The characteristic of the component to be installed may be a weight of the component, for example.

For example, the processing unit is part of the detection unit which generates the geometrically different variants of the component based on the free space available for installing the component in the installation environment. Subsequently to having determined the characteristic of the component to be installed and the available free space for the installation of the component in the installation environment by the detection unit, the geometrically different variants of the component may be generated. The different variants of the component may by geometrically deviating embodiments of the component with respect to the component to be installed. Thereby, the dimensions and/or the weight of the component may be varied, for example, so that geometrically different variants of the component to be installed arise. Anyway, generating of the different variants of the component takes place based on the free space available for installing the component in the installation environment. On the one hand, this available free space results from the predetermined free space which is defined by the geometry of the component to be installed. For example, this is the free space required by the component. On the other hand, this available free space results from the moving space required by a user, for example the assembly personnel, as to be able to carry out the installation of the component in the installation environment.

In other words, the available free space includes the free space predetermined by the geometry of the component, which free space is determined by the dimensions of the component, as well as that moving space or leeway which the user requires as to install the component in the installation environment.

The component is an aircraft component, for example. For example, this may be electric systems as well as electric lines or other supply lines. Furthermore, the component may be a fastening element or device which is provided for a region that is difficult to access in the installation environment. However, by means of the component configurator, geometrically different variants of the component may be generated which facilitate and enable to the user, i.e., to the assembly personnel, to ensure a quick and safe mounting of the component even in regions which are difficult to access.

After generating the geometrically different variant, a selected variant of the generated geometrically different variants may be installed in the installation environment instead of the component to be installed.

According to an embodiment of the invention, the characteristic of the component to be installed comprises information about a dimension of the component.

For example, this may be dimensions of the component to be installed. Furthermore, the characteristic may be a weight of the component to be installed. The free space predetermined by the geometry of the component may be determined or calculated on the basis of the characteristics of the component to be installed or the dimensions of the component. Finally, determining the free space predetermined by the geometry of the component is necessary for generating the geometrically different variants of the component. For example, the dimensions of the geometrically different variants may be smaller than the dimensions of the component to be installed so that all generated geometrically different variants fit into the available free space. For example, the component is a three-dimensional component.

According to a further embodiment of the invention, the required moving space of the user is dependent on an installation force to be applied and/or on a predetermined installation time. Furthermore, the required moving space of the user may be dependent on a number of installation forces to be applied.

For example, the required moving space of the user is the larger, the lower the predetermined installation time is. The reasoning behind this may be that a larger moving space is required for quick movements, for example arm movements of the user. Likewise, the moving space may be the larger, the bigger the installation force to be applied is. The reasoning behind this may be that a greater installation force is required form heavier components and, hence, a larger leeway is required for the user so that the user is able to install the component in the provided position in the installation environment. Here, the installation may be done manually or with the help of a tooling.

Furthermore, it may be determined by the installation force to be applied whether or not a tooling is required for installing the component. Depending on whether or not a tooling is used for installing the component, the moving space may likewise be variable. Here, the required moving space of the user may depend on the type of the required tooling.

According to a further embodiment of the invention, the detection unit is configured to partition the free space available for installing the component in the installation environment into virtual subsections.

The available free space may be three-dimensional and may be spatially partitioned into tetrahedrons. This increases the accuracy for detecting the available free space as well as for generating the geometrically different variants of the components based on the available free space. Hence, the available free space may be partitioned in a net-like manner into three-dimensional partial objects of a desired size, for example. This will be elucidated in more detail in the description of the drawings.

According to a further embodiment of the invention, the free space available for installing the component in the installation environment defines a maximal extension of the variants of the component to be generated.

This means that the dimensions of the variants of the component to be generated do not extend beyond the corresponding dimensions of the component to be installed. In other words, the geometrically different variants of the component have dimensions which maximally correspond to the related dimensions of the component to be installed. Thereby, it can be ensured that even the geometrically different variants of the component can be mounted or installed into the available free space. Thus, multiple different variant or shapes of a component may be generated from which one is finally selected for installation, wherein the generated geometrically different variants fit into the available free space or are adapted to the available free space in terms of their size, respectively.

According to a further embodiment of the invention, the detection unit is configured to determine a preferred position for installing a selected variant of the component within the free space available in the installation environment for installing the component. Here, the selected variant represents a specific geometrically different variant of the component.

For example, the preferred position may depend on the accessibility as well as on the shape of the component. For example, the preferred position may be determined in such a manner that the selected variant of the component may be mounted quickly and reliably at the preferred position in the installation environment. However, the preferred position may depend on the free space predetermined by the geometry of the component and/or on the required moving space of the user. Here, it may be considered if and possibly which adjacent components are present as to, hence, reduce the risk of injuries during a subsequent installation of the selected variant, for example. This means that adjacent component which must not be touched by the user during installation of the selected variant of the component have an influence on the preferred position for installing the selected variant of the component. For example, the preferred position may be determined such that touching of adjacent component, as for example touching electric wires, by the user is avoided.

According to a further embodiment of the invention, the detection unit is configured to determine a minimum distance to adjacent components depending on the type of the variant of the component to be generated.

Thus, it can be ensured that components which must not be in contact with other components are spaced apart from each other at a minimum distance. Furthermore, thermal extensions during operation of the component may be considered, wherein in this case the minimum distance depends on the thermal extension of the variants of the component to be generated under operating conditions. A minimum distance between a generated mounted variant of the component and adjacent components may further result in a reduced susceptibility to corrosion as adjacent components are not in contact with generated variants of the component when they are in the mounted state.

According to a further embodiment of the invention, the detection unit is configured to determine a preferred movement of the user for installing a selected variant of the component. For determining the preferred movement for the installation, it is possible to consider an adjacent geometry or the minimum distance to adjacent components. In particular, a distance-geometry for adjacent components may be determined, which may be used as a basis for determining the preferred movement for the installation.

This may also reduce the risk of injuries for the user as, for example, a motion path or a trajectory for the movement, for example of an arm of the user, may be predetermined. For example, this preferred movement may be output on a monitor, wherein it is possible that warning signals are output in case of deviating from the preferred movement. For example, this may be the case if the user approximates an electric wire during installation of the selected variant of the component and, hence, the risk of a damage or of an electric shock exists. Then, the user may be indicated in form of a warning signal that there is a deviation from the preferred movement. Possibly, a risk of injuries may be output in form of an acoustical or optical warning signal. Detecting a movement executed by the user may take place by a method for movement detection, as for example motion tracking.

According to a further embodiment of the invention, the free space available for installing the component in the installation environment is dependent on a desired installation order of multiple components to be installed.

In other words, a required installation order may have an influence on the generation of the different variants of the component. There, in particular the shape of the different variants of the component to be generated may depend on the installation order. This may have a positive influence on the mounting speed or installation speed, inter alia.

According to a further embodiment of the invention, the free space available for installing the component in the installation environment is dependent on a reusability of the component to be installed.

This means that a specific free space is required for installation and disassembling of the component to be installed and/or of the different variants of the component to be generated, wherein this specific free space is different from a free space which is suitable merely for installation, but not for disassembling. Hence, also the free space or space required for disassembling of the component may have an influence on the free space available for installation of the component in the installation environment and, hence, on the respective geometry of the variants of the component to be generated. The initial component to be installed may be considered kind of placeholder in the form of an existing geometry. This geometry of the component to be installed predefines the available free space which is the basis for determining the different variants of the component. In other words, the free space determined this way reflects kind of boundary condition for determining the different designs of the component. In this respect, the component to be installed describes the existing geometry of the installation, for example.

The reusability of an existing component or the suitability for installation and disassembly may, hence, have an influence on the available free space which, in turn, may serve as a calculation basis for the different (design-) variants of the component.

According to a further embodiment of the invention, the free space available in the installation environment for installing the component is dependent on a complexity of the component to be installed.

In other words, the complexity of the available free space and, hence, of the variants of the component to be generated may depend on the complexity of the component to be installed. The complexity relates, for example, to the shape, i.e., the boundary geometry, of the available free space, which, eventually, is also determined by the complexity of the geometry of the component to be installed. Thereby, a complexity of the available free space may be the greater, the greater the complexity of the component to be installed is.

When generating the different variants of the component, also information about already known component geometries may be utilized. Determining the available free space for installing the component in the installation environment may, hence, depend on an already known or similar geometry of a component. Here it is possible that the moving space required by the user defines the available free space for installation to a greater extent than the free space predetermined by the geometry of the component.

According to an aspect of the disclosure, a method for generating variants of an aircraft component to be installed is provided. In one step of the method, detecting a characteristic of a component to be installed takes place by a detection unit. In a further step, determining an available free space for installing the component in an installation environment takes place by a detection unit. Here, the free space available for the installation of the component in the installation environment is defined by a free space predetermined by a geometry of the component and/or dependent on a moving space, i.e., moving leeway, required by a user. In a further step of the method, generating geometrically different variants of the component based on the free space available for installing the component in the installation environment takes place by the detection unit.

The method may further comprise additional steps, wherein the method steps may vary with respect to their order.

For example, in a further step a preferred position for installing a selected variant of the component is output and/or a preferred movement for installing a selected variant of the component by the user is output. This output may be done via a display device, for example.

According to another aspect of the disclosure, a program element is provided which is executed on a processor of a component configurator. The program element may be configured to instruct the component configurator to execute various steps when being executed by the processor of the component configurator. In one step, a characteristic of the component to be installed is detected by a detection unit. In a further step, determining an available free space for installing the component in an installation environment takes place by a detection unit. Here, the free space available for the installation of the component in the installation environment is defined by a free space predetermined by a geometry of the component and/or said free space is dependent on a moving space required by a user. In a further step of the method, geometrically different variants of the component are generated by the detection unit based on the free space available for installing the component in the installation environment.

According to a further aspect, a computer readable medium is provided on which the described program element is stored.

The component configurator enables defining components with regard to their dimensions and, hence, determines a possible free space for generating different variants of the component. This free space as well as a moving space for a user may be partitioned into a net of subsections having a desired size. These subsections serve as abstract location information, for example for a part of the body of the user or for a component. The moving space or the size of the subsections may depend on the type of the object to be moved, i.e., the part of the body, the tooling, the material, and/or the predetermined installation time.

Generating the geometrically different variants of the component may be executed by the detection unit in an automated manner. This means that generating the geometrically different variants may be done automated after determining the available free space for installing the component in the installation environment. Thereby, the detection unit may utilize a description logic by means of which those subsections of the moving space are identified which are in fact required for a movement of an object or a component or a part of the body of the user. Such movements may be, for example, pure translational movements, but also rotational movements as, for example, screwing movements. For example, the component to be installed may be a reinforcement plate which is screwed to an aircraft structure. Furthermore, the component to be installed may be a snap lock or a fastening device for the aircraft structure. The moving space may also be required for maintenance work. In particular, verification and quality checks as well as a verification of the installation status may be provided such that the moving space is adapted depending on the task to be executed. Observations of human movements or motions may be captured for determining the required moving space of the user, so that information about a moving leeway are acquired and stored for a specific task.

Furthermore, these movements may be analyzed with regard to forces to be applied or installation times to be complied with. The information gathered by the capturing or analyzing may be controlled by the description logic so that possible regions for movements of similar tasks or for installation of the geometrically different variants of the component may be determined. Hence, the description logic may determine different solutions or different moving spaces which are suitable for the installation of a selected variant of the component. The detection unit may be configured to determine the preferred position for installing a selected variant of the component and/or the preferred movement for the installation of a selected variant of the component by the user such that the selected variant may be installed as fast as possible. In particular, the most efficient installation route may be determined by the detection unit (may also be referred to as determination unit). Thereby, also the weight of the selected variant may be considered, inter alia. The component configurator may be utilized for verification during operation and for maintenance purposes.

On the one hand, the component configurator may determine an installation access for installing of the component to be installed based on results of an optimization. On the other hand, an abstract representation of the available free space, i.e., of the moving space, inter alia, may be provided by using a three-dimensional network. Possible installation positions or free spaces for installing the component to be installed or of a selected variant of the component may be predetermined by a corresponding description logic which considers the abstract three-dimensional representation of the available free space. Thereby, time slots may be considered by means of measured time method (MTM) so that the available free space may depend on the predetermined installation time and is optimized in terms of chronologically subsequent motion sequences.

As a result of detecting the characteristic of the component to be installed, the component configurator may take into account installation requirements in general, as for example a predetermined cable length, predetermined weight or predetermined costs. The free space available for installing the component in the installation environment is defined by the free space predetermined by the geometry of the component. The free space predetermined by the geometry of the component may be partitioned into subsections, in particular into a three-dimensional network of subsections. For example, these subsections may be shaped like a tetrahedron or like a pyramid. In other words, the given component geometry may be considered a rough design, wherein this rough design is partitioned into the subsections. A description logic may identify the possible movement of elements or components within the generated network. Thereby, the free space available for a possible moving of the component, in particular of a selected variant of the component, to the provided installations position results. Specification of a minimum distance of the component to be installed with regard to adjacent component may be considered by installation rules.

By means of the description logic, the geometrically different variants of the component may be determined or designed based on the available free space. Different steps may be executed by the component configurator from determining the available free space up to generating the geometrically different variants of the component.

First, tasks or requirements which relate to installing specific cabin elements in a passenger cabin of an aircraft may be identified first. For example, such a cabin element may be the component to be installed or a selected variant of the generated variants of the component in terms of the present disclosure.

In a further step, a region may be identified, in particular a three-dimensional region, which is predetermined by a specific component. This may be the component to be installed. Such components are, for example, side walls, floor plates, cabin walls, regions above the cabin ceiling, etc.

After identifying the region, an identification of information or of characteristics of the component to be installed may happen. Identification of characteristics or information about the component to be installed may be supported by existing definitions, drawings, requirement catalogs, construction documents, description of technical contents, as for example modifications, certification documents, etc.

In a further step, identification of an available free space takes place. This free space specifies the options for generating geometrically different variants of the component which may correspond with the type of the component to be installed, however, may be of different shapes.

In a further step, a so-called key performance indicator (KPI) is determined. This parameter provides information about a requirement to be met by the component to be generated, for example. Such a characteristic relates, for example, a weight, a length, for example of a cable, material costs, component costs, installation costs, maintenance costs, performance, reusability, etc.

In a further step, a prioritization takes place in consideration of the key performance indicator. In this steps, an appropriate installation space is identified. Thereby, measures or dimensions of the components to be installed may be considered. Further, minimum distances with regard to adjacent components may be taken into account. In a further step, a proposal for a rough design of a geometrically different component to be generated is created. In particular, a plurality of geometrically different variants of the component may be created.

In a further step, a specific variant of the component is selected so that this selected variant of the component may be considered for further calculations. Thereby, a detailed design may happen, for example by means of computer aided design. In the end, the selected variant of the component may be utilized in the installation environment.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
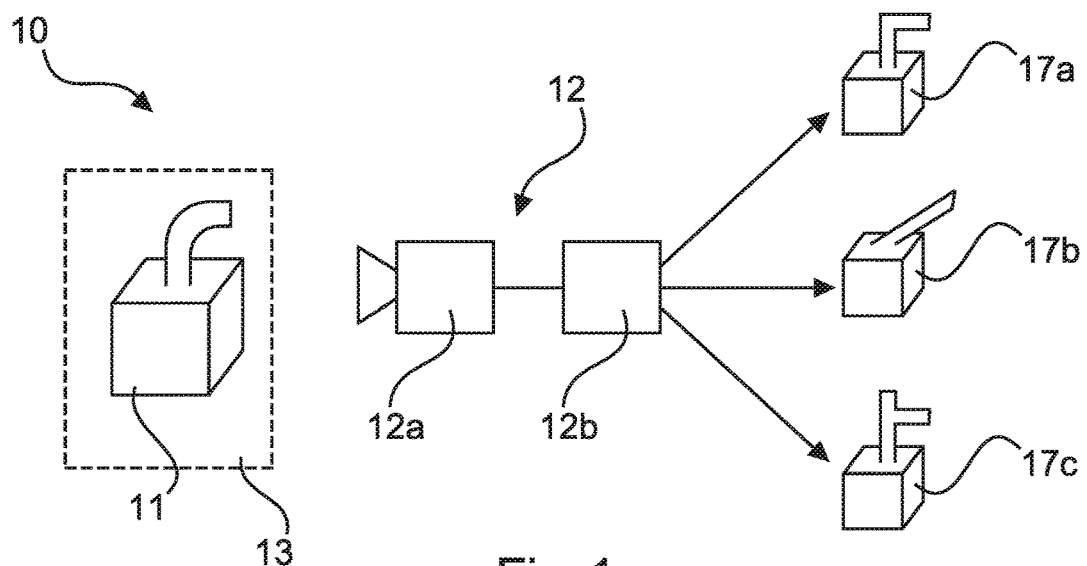
FIG. 1 shows a component configurator for generating variants of a component to be installed according to an exemplary embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The representations in the drawings are schematic and not to scale.

If in the following description of the drawings similar reference signs are used in different drawings, these refer to equal or similar elements. However, equal or similar elements may be referred to by different reference signs.

FIG. 1 shows a component configurator 10 which comprises a detection unit 12. In turn, the detection unit 12 comprises an acquiring unit, for example in the form of sensors 12a, and a processing unit or a processor 12b. The component configurator 10 can acquire or detect a characteristic of a component 11 to be installed by means of the detection unit 12. This may be, for example, a dimension or a weight of the component 11 to be installed. Furthermore, the detection unit 12 may determine a free space 13 available for installing the component 11 in an installation environment which is not shown in FIG. 1. Here, the free space 13 available for the installation of the component 11 may be dependent on the geometry of the component 11 and/or dependent on a moving space required by a user. A multitude of geometrically different variants of the component 17a, 17b, 17c may be generated by the detection unit 12, in particular by the processing unit 12b, based on the free space 13 available for installing the component 11 in the installation environment. These geometrically different variants differ from the component 11 to be installed with regard to their shape, wherein the geometry of the component 11 to be installed is relevant for the available free space 13.

Figure 2:
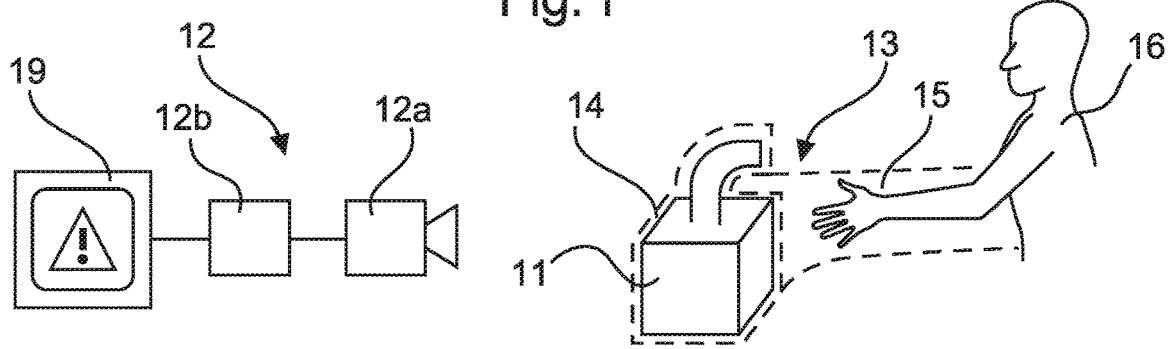
FIG. 2 shows determination of a free space available for installing a component in an installation environment according to an exemplary embodiment of the invention.

FIG. 2 shows detecting or capturing of the free space 13 available in an installation environment. Here, the available free space 13 is provided for installing the component 11 in the installation environment. The available free space 13 is partitioned in two subsections. Here, the available free space 13 depends on the one hand on a free space 14 defined by a geometry of the component 11 and/or depends on a moving space 15 required by a user 16. Here, the required moving space 15 may be provided in the form of a leeway for a possible movement of a part of the body of the user 16. On the other hand, the free space 14 predetermined by the geometry of the component 11 reflects exactly or substantially the dimensions or the shape of the component 11 to be installed. This free space 14 predetermined by the geometry of the component 11 may be enlarged with respect to the component 11 to be installed by a minimum distance which must be ensured. For example, this minimum distance may be provided between the component 11 to be installed and adjacent components. The detection unit 12 which is split up into the sensors 12a for acquiring the characteristic of the component 11 to be installed and the processing unit 12b may be connected to an output unit 19 which outputs an optical or acoustical signal to the user 16. Here, a system for motion tracking may be provided which may capture a motion of the user 16 and of the component 11 to be installed during the installation, for example. In particular, information about a real and a virtual geometry may be used for this purpose. This may be a warning signal which indicates a deviation from a preferred movement of the user 16 within the moving space 15.

Figure 3:
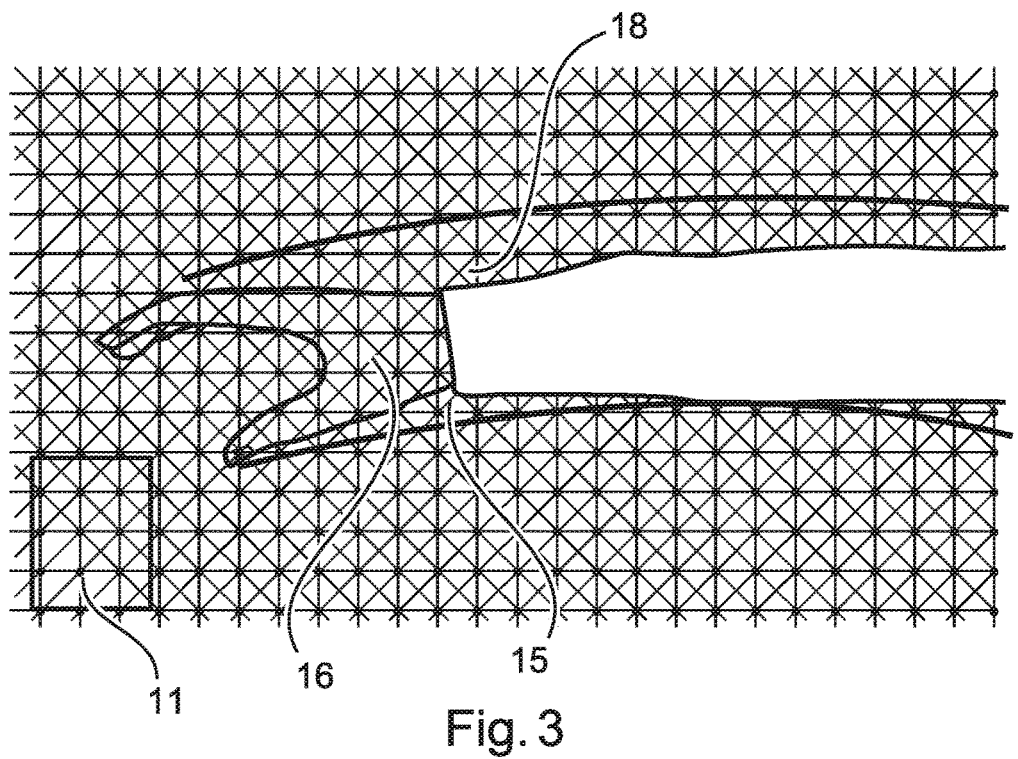
FIG. 3 shows partitioning of a moving space of a user according to an exemplary embodiment of the invention.

FIG. 3 shows a partitioning of the moving space 15 of a part of the body of the user 16 into different subsections 18. In this case, the subsections 18 may be two-dimensional or three-dimensional. The subsections 18 are, in particular, pyramid-shaped or in the form of a tetrahedron or cuboid. Thereby, the moving space 15 may define that required free space which is required by the user 16 as to provide the component 11 to be installed to a corresponding installation position in the installation environment.

Figure 4:
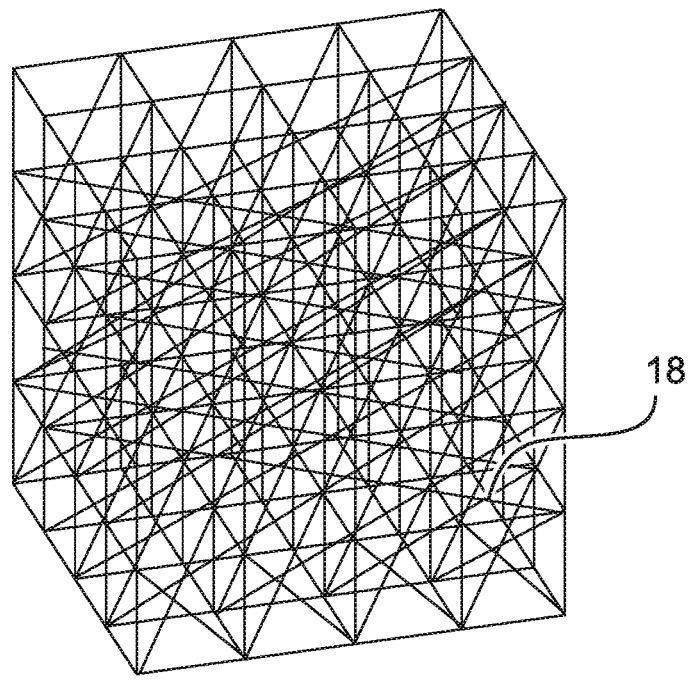
FIG. 4 shows partitioning of a component to be installed according to an exemplary embodiment of the invention.

FIG. 4 shows a three-dimensional representation of a partitioning of a free space into subsections 18. Here, the component to be installed itself, but also the available free space may be partitioned into subsections 18.

Figure 5:
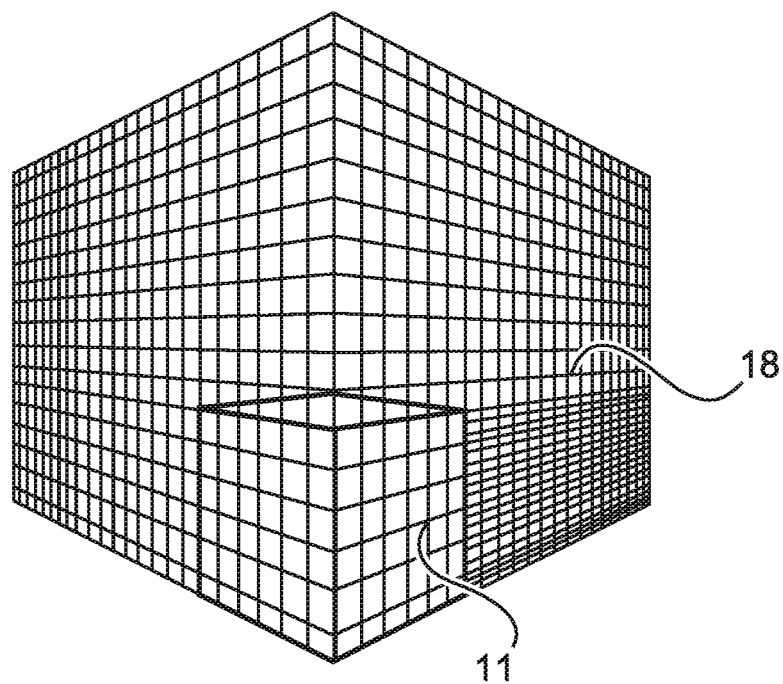
FIG. 5 shows partitioning of an installation environment with a component to be installed according to an exemplary embodiment of the invention.

FIG. 5 shows partitioning of an installation environment into subsections 18. Here, a component 11 to be installed is provided in the installation environment, wherein said component is installed in the installation environment. The component 11 is partitioned into subsections 18, too.

Figure 6:
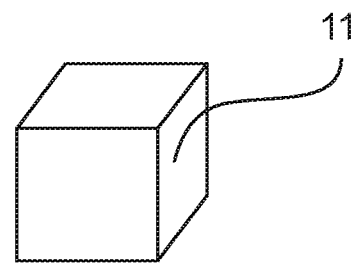
FIG. 6 shows a three-dimensional geometry for a component to be installed according to an exemplary embodiment of the invention.

FIG. 6 shows an example of a three-dimensional geometry of a component 11 to be installed. This may be a model of a CAD-program which is installed in the installation environment subsequent to its realization or manufacturing. Hence, the component 11 to be installed defines a type of a component which forms the basis for generating the geometrically different variants of the component 17a, 17b, 17c based on the free space 13 available for installing the component 11 in the installation environment.

Figure 7:
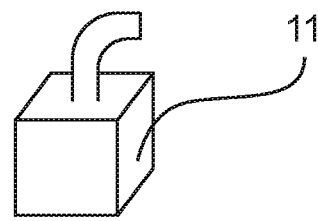
FIG. 7 shows a positive form of a component to be installed according to an exemplary embodiment of the invention.

FIG. 7 shows a positive form of a component 11 to be installed. In particular, FIG. 7 shows a CAD-model of the component 11 to be installed.

Figure 8:
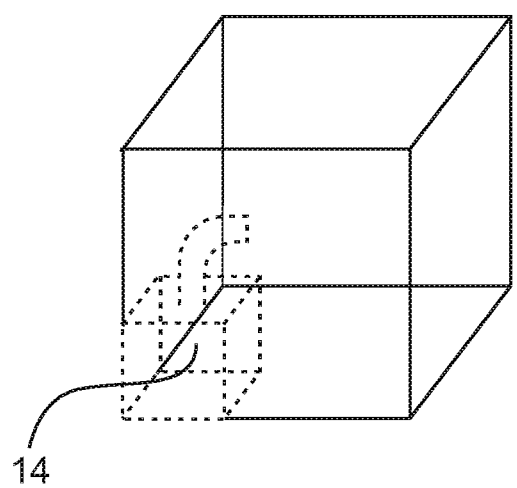
FIG. 8 shows a negative form of a component to be installed according to an exemplary embodiment of the invention.

Based on this positive form shown in FIG. 7, a negative form as shown in in FIG. 8 may be determined. This negative form represents the free space 13 available for installing the component 11 in an installation environment. In particular, the free space 14 predetermined by the geometry of the component 11 is described by the negative form. This means that the free space 14 predetermined by the geometry of the component 11 represents a maximum dimension or a maximum expansion for the geometrically different variants of the component 17a, 17b, 17c to be generated. In other words, a generated variant of the component 17a, 17b, 17c may not go beyond the boundary surfaces of the negative form.

Figure 9:
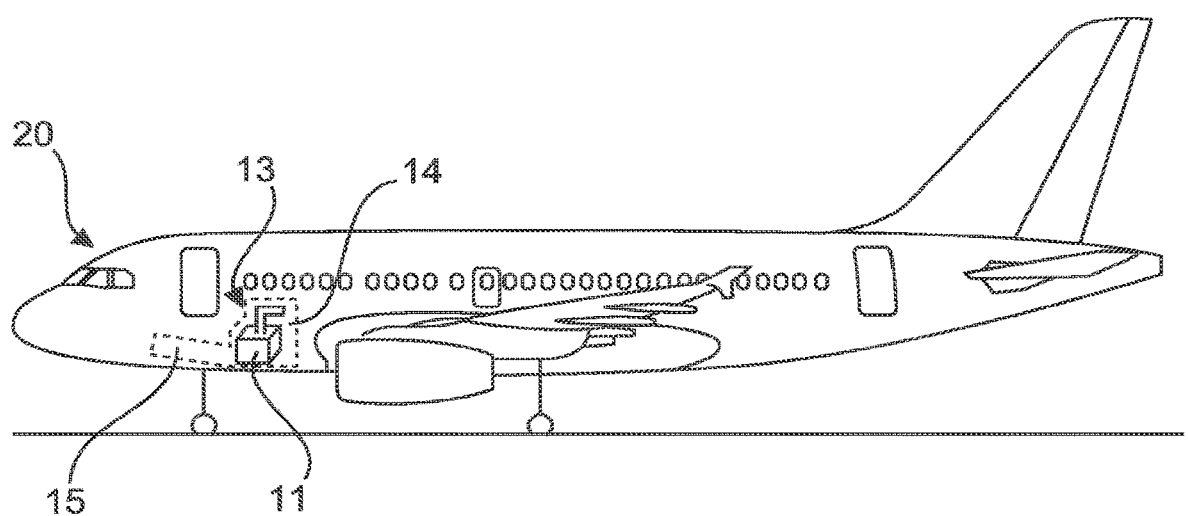
FIG. 9 shows an installation environment according to an exemplary embodiment of the invention.

FIG. 9 shows an installation environment 20 for installing the component 11. Here, an available free space 13 is determined by the detection unit 12, wherein the available free space 13 within the installation environment 20 is partitioned into a free space 14 predetermined by the geometry of the component 11 and a free space defined by the required moving space 15. Here, the installation environment 20 may be a part of an aircraft, for example. For example, the installation environment is arranged in a cargo area or in a passenger area of the aircraft.

Figure 10:
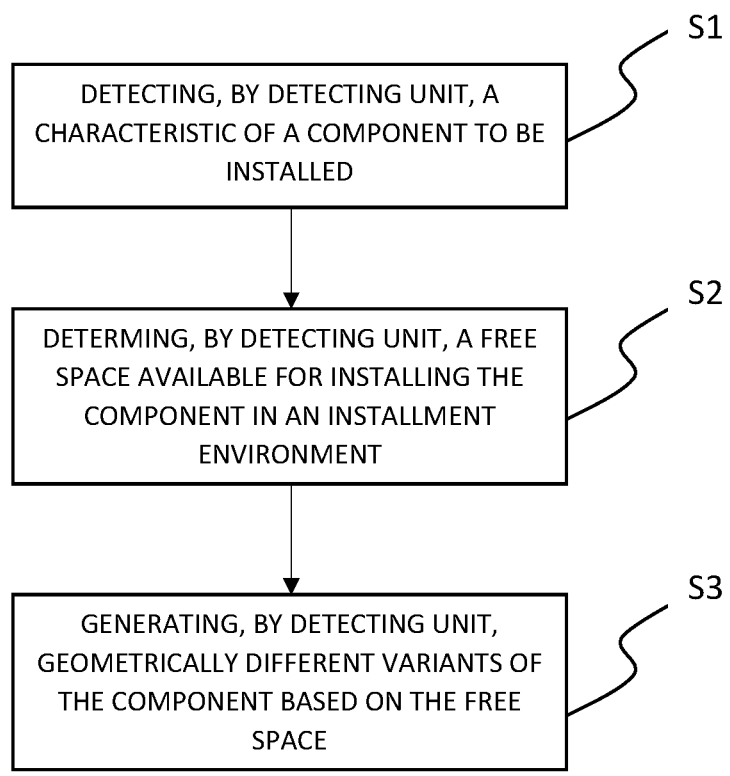
FIG. 10 shows a flow chart of a method for generating variants of a component of an aircraft.

FIG. 10 shows a flow chart of a method for generating variants of an aircraft component 11 to be installed. In a first step S1, a characteristic of the component 11 to be installed is detected by a detection unit 12. In a further step S2, a free space 13 available for installing the component 11 in an installation environment 20 is determined by the detection unit 12. Here, the free space 13 available for the installation of the component 11 in the installation environment 20 is defined by a free space 14 predetermined by a geometry of the component 11 and/or is dependent on a moving space 15 required by a user 16. In a further step S3, geometrically different variants of the component 17a, 17b, 17c are generated by the detection unit 12 based on the free space 13 available for installing the component 11 in the installation environment 20.

Additionally, it is noted that "comprising" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A component configurator for generating variants of an aircraft component to be installed, comprising:
   a detection unit for detecting a characteristic of the component to be installed and for determining a free space available for installing the component in an installation environment, the characteristic comprising a first geometry of the component;
   wherein the free space available for installing the component in the installation environment is defined by a free space predetermined by the geometry of the component and is dependent on a moving space required by a user, wherein the free space is partitioned into first and second subsections, the first subsection defined by the geometry of the component and the second subsection defined by the moving space required by the user; and
   wherein the detection unit is configured to generate geometrically different variants of the component based on the free space available for installing the component in the installation environment such that a geometry of each of the geometrically different variants of the component is different than the first geometry of the component.

2. The component configurator according to claim 1, wherein the characteristic of the component to be installed comprises information about a dimension of the component.

3. The component configurator according to claim 1, wherein the required moving space of the user is dependent on an installation force to be applied and/or on a predetermined installation time.

4. The component configurator according to claim 1, wherein the detection unit is configured to partition the free space available for installing the component in the installation environment into subsections.

5. The component configurator according to claim 1, wherein the free space available for installing the component in the installation environment defines a maximum extension of the variants of the component to be generated.

6. The component configurator according to claim 1, wherein the detection unit is configured to determine a preferred position for installing a selected variant of the component within the free space available in the installation environment for installing the component.

7. The component configurator according to claim 1, wherein the detection unit is configured to determine a minimum distance to adjacent components depending on the type of the variants of the component to be generated.

8. The component configurator according to claim 1, wherein the detection unit is configured to determine a preferred motion for installing a selected variant of the component by the user.

9. The component configurator according to claim 1, wherein the free space available for installing the component in the installation environment is dependent on a desired installation order of multiple components to be installed.

10. The component configurator according to claim 1, wherein the free space available for installing the component in the installation environment is dependent on a reusability of the component to be installed.

11. A method of generating variants of an aircraft component to be installed, the method comprising the steps of:

acquiring, by a detection unit, a characteristic of the component to be installed, the characteristic comprising a first geometry of the component;

determining, by the detection unit, a free space available for installing the component in an installation environment, wherein the free space available for installing the component in the installation environment is defined by a free space predetermined by a geometry of the component and is dependent on a moving space required by a user, wherein the free space is partitioned into first and second subsections, the first subsection defined by the geometry of the component and the second subsection defined by the moving space required by the user; and generating, by the detection unit, geometrically different variants of the component based on the free space available for installing the component in the installation environment such that a geometry of each of the geometrically different variants of the component is different than the first geometry of the component.

12. A non-transitory computer readable medium, having stored thereon program instructions configured to instruct a component configurator to execute the following steps when being executed by a processor of the component configurator:

acquiring, by a detection unit, a characteristic of the component to be installed, the characteristic comprising a first geometry of the component;

determining, by the detection unit, a free space available for installing the component in an installation environment, wherein the free space available for installing the component in the installation environment is defined by a free space predetermined by a geometry of the component and is dependent on a moving space required by a user, wherein the free space is partitioned into first and second subsections, the first subsection defined by the geometry of the component and the second subsection defined by the moving space required by the user; and generating, by the detection unit, geometrically different variants of the component based on the free space available for installing the component in the installation environment such that a geometry of each of the geometrically different variants of the component is different than the first geometry of the component.

* * * * *